United States Patent [19]

Adams

[11] 3,814,550

[45] June 4, 1974

[54] MOTOR ARRANGEMENT AND LUBRICATION SYSTEM FOR OSCILLATORY COMPRESSOR

[75] Inventor: Glen O. Adams, Louisville, Ky.

[73] Assignee: General Electric Company, Louisville, Ky.

[22] Filed: Dec. 7, 1972

[21] Appl. No.: 313,154

[52] U.S. Cl. .................................................. 417/417
[51] Int. Cl. ............................................. F04b 17/04
[58] Field of Search ............................... 417/416, 417

[56] References Cited
UNITED STATES PATENTS

| | | | |
|---|---|---|---|
| 2,865,559 | 12/1958 | Gigler | 417/416 |
| 3,543,061 | 11/1970 | Wallace | 417/416 |
| 3,729,691 | 4/1973 | Beiswinger et al. | 417/417 |

*Primary Examiner*—C. J. Husar
*Attorney, Agent, or Firm*—Francis H. Boos, Jr.

[57] ABSTRACT

The production of an unbalanced, electrodynamic driving force to compensate for unbalanced compression forces in an oscillatory compressor is affected by a relative null positionment of the armature and air gap to locate an effective midplane of air gap flux density on the compression stroke side of a maximal plane of armature strength.

The substitution of permanent ceramic magnets for the usual metal alloy (Alnico) magnets not only results in substantial cost and weight savings but, also, permits a surrounding, concentric arrangement of the magnets and armature in widely spaced relation to the compression cylinder to preclude substantial heat transfer therebetween.

A vibrating tube pump, operative as a function of the reactive reciprocation of the compression cylinder and its interconnected casing, transfers lubricating oil upwardly from a lower housing reservoir to a compressor casing sump from whence the oil is distributed to the open, upper end of the compression cylinder to lubricate the same.

7 Claims, 8 Drawing Figures

MOTOR ARRANGEMENT AND LUBRICATION SYSTEM FOR OSCILLATORY COMPRESSOR

BACKGROUND OF THE INVENTION

The usual oscillatory compressor employs an electromagnetic drive whose uniformly wound, annular armature is reciprocated, within an annular air gap defined by the pole pieces of a permanent magnet, to either side of a null position defined by opposed centering springs. Inasmuch as the plane of maximum field strength perpendicular to the axis of such a uniformly wound armature would comprise a perpendicular bisector plane and since the magnetic flux across the annular air gap is substantially uniform throughout, the annular armatures of conventional oscillatory compressors are biased toward a null position wherein the plane of maximum armature field strength is coincident with a midplane of the annular air gap. Stated differently, the annular armature and air gap are conventionally centered in the null position. Under no load conditions and/or in the absence of unbalanced forces, such an arrangement produces equal positive and negative displacements, from the null position, and the frequency of such displacements is equal to the exciting frequency.

When a reciprocating motor of this type is used to drive a compressor piston throughout distinct compression and suction strokes under load, as contrasted with those type compressors employing opposed in-line compression chambers, the forces are, of course, unbalanced resulting in greater negative, or suction, displacement relative to the null position. Stated differently, the midpoint of the reciprocating stroke length, under unbalanced load, is effectively displaced from the null position in a direction away from the unbalancing force resulting in incomplete exhaust from the compression end of the cylinder and concomitant reexpansion volume which magnifies the problem.

One object of the invention is to impart an unbalanced electrodynamic driving force to the piston to compensate for unbalanced compression forces.

Because of the great cost and weight of those permanent, metal alloy magnets heretofore considered essential to produce the required magnetic field strength for an oscillatory compressor and the corollary impracticality of forming such magnets in large and/or annular shapes; conventional magnetic circuits for producing the required, annular air gaps are kept as small as possible and normally comprise either a circuit construction closely surrounding the compression cylinder, as in U.S. Pat. No. 3,171,585 and 3,490,684 or a generally coaxial arrangement as in U.S. Pat. No. 3,597,122. The former arrangement introduces a limiting operating parameter by virtue of the ready heat transfer from the compression cylinder to the armature insulation while the latter sacrifices axial compactness which is an important consideration as regards in-cabinet mounting for refrigerator usage.

A further object relates to the use of relatively inexpensive ceramic magnets susceptible of shaping to form accuate surfaces whereby the permanent magnets comprising a part of the magnetic circuit may also constitute one of the annular pole pieces and contribute to the formation of a magnetic circuit in spaced, surrounding relation to the compression cylinder to, effectively, define an annular cooling space separating the compression cylinder and armature.

Major advantages of an electromagnetically operated oscillatory compressor are simplicity of operation and the compact arrangement of relatively few moving parts. In line with the maintenance of these advantages, a cylinder lubrication system is provided which, basically, relies upon the inherent reactive reciprocation of a resiliently mounted compressor casing.

SUMMARY OF THE INVENTION

The electromagnetic drive, for an oscillatory compressor, which comprises an annular armature mounted for relative reciprocation within an annular air gap is diliberately unbalanced in the direction of the compression end of the cylinder. This is effected by the establishment of a null armature position wherein the effective midplane of the annular air gap flux density, as taken perpendicular to the longitudinal axis thereof, lies intermediate a parallel plane of maximum armature field strength and the compression end of the cylinder. In the case of a conventional, uniform annular air gap exhibiting the usual uniform flux density thereacross (except for minor but equal "fringing" effects at opposite ends of the annular gap); the effective midplane of the annular air gap flux density would coincide with the midplane bisector of the annular air gap as taken perpendicular to the axis thereof. Similarly, a conventional, uniformly wound armature of uniform annular proportions exhibiting the usual uniform flux leakage gradient between a midplane of the annular armature and each of the opposite ends thereof has a plane of maximum field strength coincident with a midplane bisector of the annular armature as taken perpendicular to the armature axis.

Thus when using conventional armature and gap constructions, it is only necessary to null the armature relative to the air gap such that the midplane of the air gap lies intermediate the compression end of the cylinder and the midplane of the armature which will produce an unbalanced electrodynamic driving force in the direction of the compression end of the cylinder as opposed to the conventional arrangement wherein the armature is centered in the air gap to produce a balanced driving force. The null position is, of course, that position at which reciprocation of the armature damps out following deenergization of the exciting current and is controlled by the usual centering springs.

The production of the unbalanced driving force may be achieved either by varying the relative null position of an otherwise conventional oscillatory compressor or by shifting the effective center of the air gap by extending the axial length of the same in the desired direction such as by the addition of separate pole pieces or magnets. In either event, the degree of electromagnetic imbalance is selected to offset or compensate for the unbalanced forces opposing the compression stroke so that the result is a uniform displacement pump (not to be confused with piston displacement, discussed supra) which, under load, goes to the full end of its rated compression stroke thus avoiding reexpansion of precompressed gases and delivering a constant, pulsed output.

Alterations in basic design of the magnetic circuit yielding improved performance as well as substantial cost and weight savings are made possible through the use of commercially available, permanent ceramic magnets such as those barium ferrite magnets manufactured by the Allen Bradley Co. of Milwaukee, Wisconsin under the designation "M-8 Ferrite Ceramic Magnet" which are not subject to the technical impracticalities of large shape formation or the economic limitations imposed by cost and weight considerations which dictate strict design parameters on those magnetic circuits employing the usual metal alloy magnets.

The ability to form ceramic magnets in relatively large annular shapes and/or segments is utilized to one advantage in that the entire magnetic circuit may be positioned in radially spaced, surrounding relation to the compression chamber to retain the advantages of an axially compact construction while thermally isolating the magnetic circuit from the compression chamber. The advantages will be immediately apparent upon recognition that melting of armature insulation is a primary limitation on prolonged compressor operation in the conventional arrangement wherein the magnetic circuit closely surrounds the compression cylinder. Heretofore, such latter arrangement, if axial compaction is to be achieved, has been dictated by the cost and technical impracticalities of forming metal alloy magnets in large shapes. Thus, previously, the usual magnetic circuit, including its "Alnico" magnet and pole piece, has been positioned in closely surrounding and in direct, conductive heat transfer with the compression cylinder.

In the present invention, the permanent magnets, themselves, form one annular wall of the annular air gap and are radially separated from the compression cylinder as is the other pole piece and remainder of the magnetic circuit.

The compressor casing is spring mounted in a sealed compressor housing which maintains a residual oil reservoir for lubrication of the compression cylinder. Because of the resilient mounting of the compressor casing within the housing, the casing will undergo reactive reciprocation relative to the housing during compressor operation. A vibratory tube pump comprising nothing more than a check valve controlled tube extending through the lower casing wall transfers oil from the reservoir into a casing sump as a function of the reactive reciprocation of the casing relative to the housing. From the casing sump, the oil is introduced to the upper end of the compression cylinder, substantially above the sump level, in a manner reminiscent of a mist lubrication system by means which are not clearly understood. It will be recalled from the previous discussion that the magnetic circuit means are radially spaced from the compression chamber and it is within the intervening annular space that a centering spring is located and bottomed in the casing oil sump. It seems beyond peradventure that it is this particular combination that is responsible for misting and elevating the oil from the casing sump to the upper end of the cylinder on one or a combination of two bases:

1. The rapid compression and relative relaxation of the housing centering spring whose lower end is bottomed in the sump froths the oil to such an extent that the mist created thereby extends upwardly to lubricate the cylinder in a manner analogous to splash lubrication; or
2. The oil somehow travels up the centering spring as a function of surface tension effects and/or spring movement and is thrown off as a mist throughout its length of upward spring travel by adjacent spring coil impact.

That one or a combination of the foregoing effects represents the probable explanation appears inescapable when considering that the intake refrigerant flow represents the only other relatively movable force component present in the sump region and it has been empirically determined that cylinder lubrication takes place to substantially the same extent when refrigerant flow is terminated.

DESCRIPTION OF THE PREFERRED EMBODIMENTS

Figure 1:
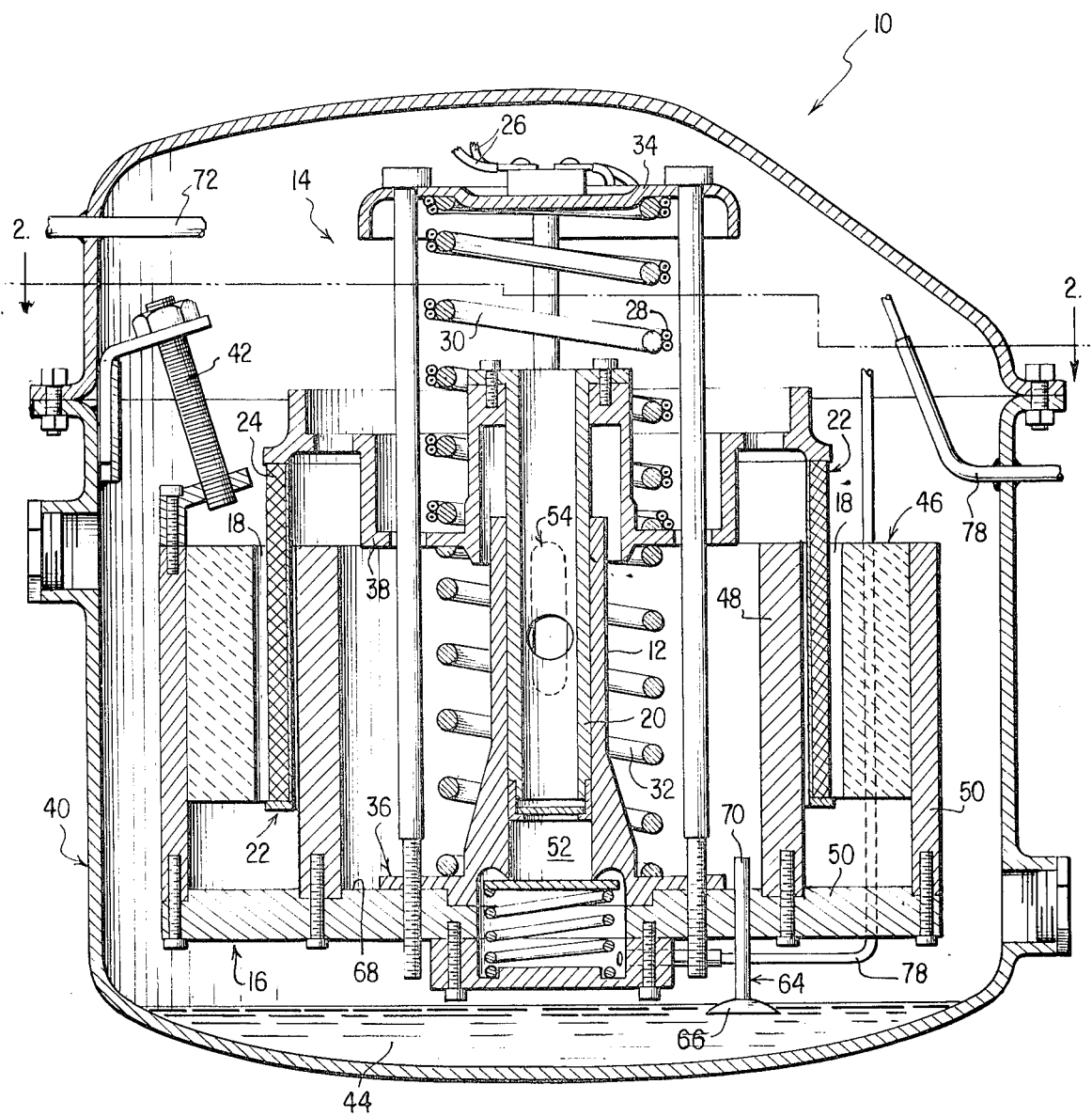
FIG. 1 is a vertical section taken through an oscillatory compressor constructed in accordance with the present invention.

In FIG. 1 is illustrated an electromagnetically operated oscillatory compressor 10 having a compression cylinder 12 rigid with compressor casing 14 and surrounding, radially spaced magnetic circuit 16 defining an annular air gap 18. A rigidly interconnected piston 20 and annular armature 22 are mounted for conjoint reciprocation in cylinder 12 and air gap 18, respectively, at a frequency corresponding to the exciting frequency of an A. C. source applied to the coil 24 of armature 22 via leads 26 and insulated conductors 28. Upon termination of the exciting source, the relatively reciprocable parts are nulled to the position of FIG. 1 by opposed, centering compression springs 30, 32 whose respective opposite ends are bottomed against upper and lower casing walls 34, 36 and whose proximate ends engage opposite sides of a yoke 38 constituting the rigid interconnection between the piston and armature.

The entire compressor casing 14 is resiliently suspended within sealed compressor housing 40 via heavy tension springs 42 and will thus undergo reactive reciprocation relative to compressor housing 40, above the level of residual oil reservoir 44, as a function of piston and armature reciprocation.

Figure 2:
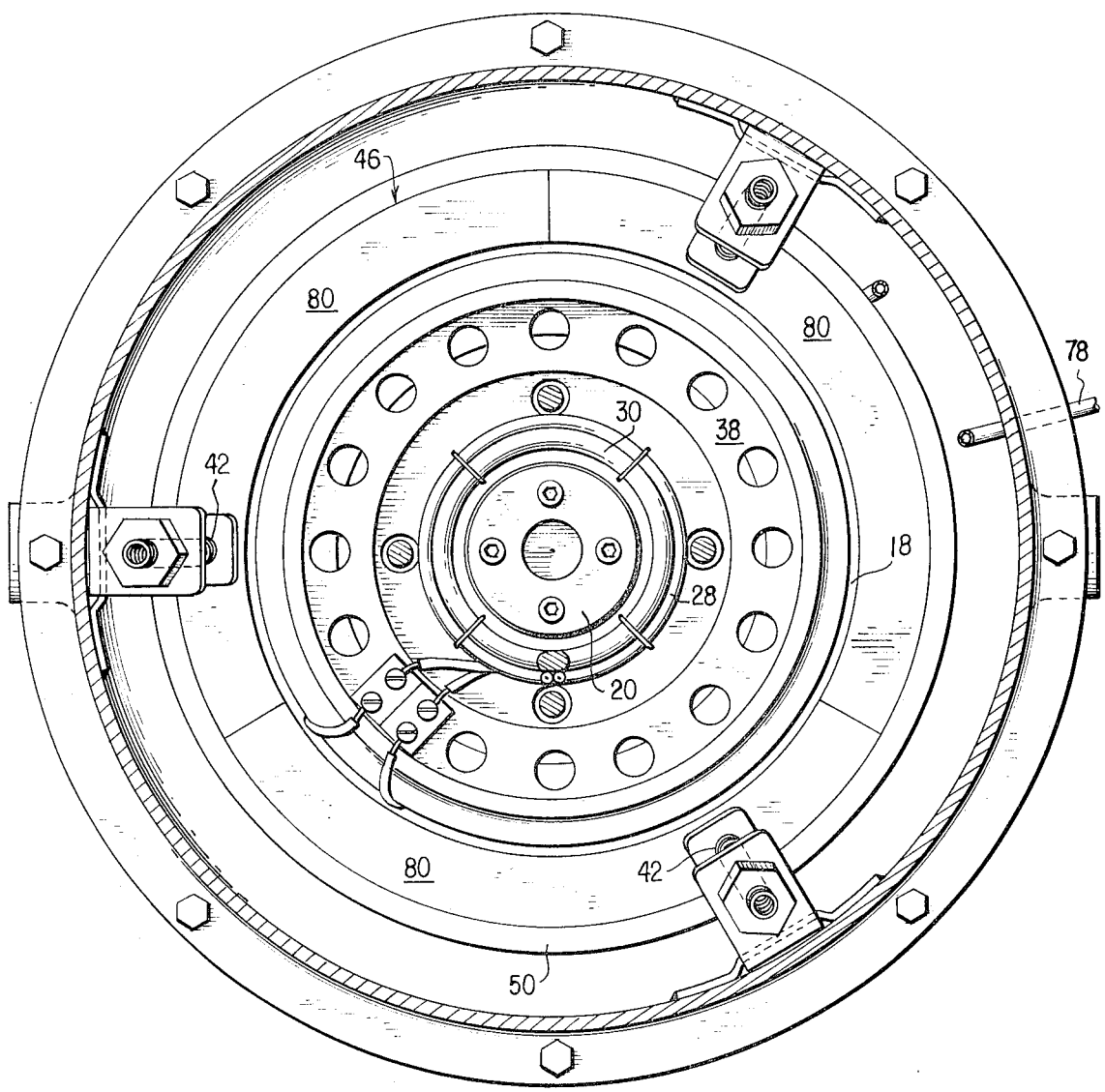
FIG. 2 is a sectional view taken along line 2—2 of FIG. 1.

Magnetic circuit 16 is continually energized by the annular, ceramic, permanent magnet array 46 (FIG. 2) constituting one annular pole piece which, with the other annular pole piece 48, air gap 18 and intervening soft iron return path 50 constitutes the magnetic circuit 16. In the case of a uniform air gap as illustrated herein, the flux density across air gap 18 will be substantially uniform throughout the axial extent thereof (as measured along the longitudinal axis of the annular air gap) and the effective midplane of air gap flux density will lie equidistant from either axial end of the annular air gap. Similarly, in the case of a uniformly wound armature as herein illustrated, the plane of maximum field strength, as taken perpendicular to the axis thereof, will lie equidistant from opposite ends thereof. The piston and armature combination is then nulled to the position of FIG. 1 by the selection of appropriate centering springs 30, 32 whereby the midplane of the air gap lies intermediate the midplane of the armature and the compression end 52 of compression cylinder 12. The result is an unbalanced electrodynamic driving force exhibiting a greater driving force on the downward (as viewed in FIG. 1) compression stroke to compensate for unbalanced forces opposing such compression stroke when the compressor is loaded. When running in the unloaded state, the positive or downward stroke from the null position of FIG. 1 will, of course, exceed the negative or upward stroke. A slot and bore arrangement 54 comprises a compression medium intake port to the hollow interior of piston 20 in addition to the intake afforded by the open, upper end of the piston.

Figure 3:
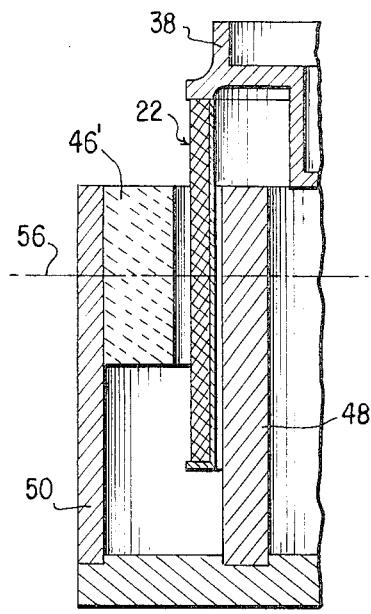
FIGS. 3–6 are schematic illustrations of various armature and air gap positions.

FIG. 3 is a fragmentary, schematic illustration of a conventional arrangement wherein the armature and piston are biased to a null position in which the air gap and armature midplanes are coincident, as indicated by the single plane 56 through magnet array 46' and armature 22, thus resulting in equal positive and negative displacements, upon energization of the armature, when running unloaded. Under load, the unbalanced compression forces effectively reduce the positive stroke length resulting in incomplete compression and exhaust with the consequent reexpansion volume compounding the effect and reducing efficiency.

Figure 4:
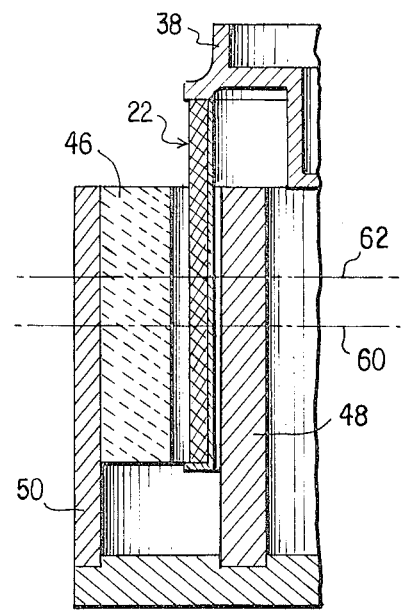
Figure 5:
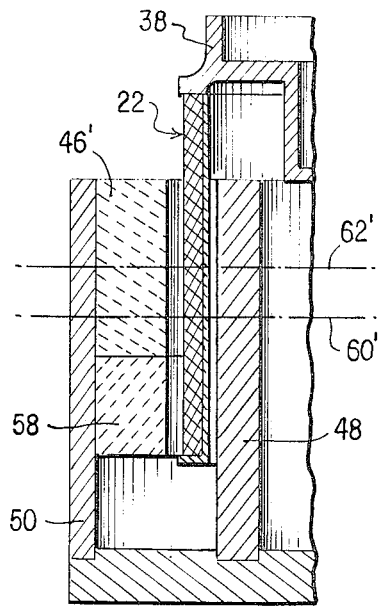
Figure 6:
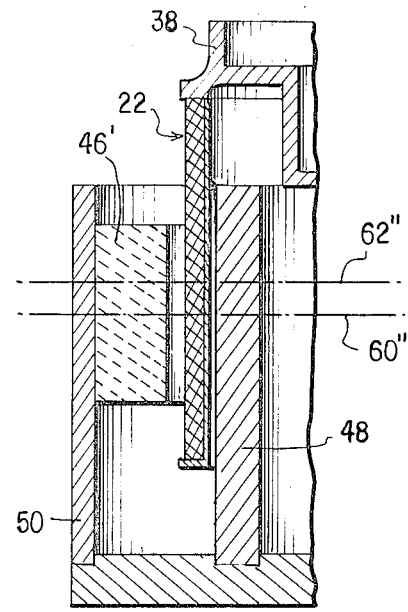

The relative displacement of the air gap and armature midplanes to produce a substantially constant displacement compressor, as described in connection with FIG. 1, may be effected by extending the axial length of the magnet (FIGS. 1 and 4), by the addition of a second annular magnet array 58 on the compression chamber side of magnet array 46' as in FIG. 5, or by shifting the position of magnet 46' downwardly as in FIG. 6. In any event, the result is to position the midplane 60 (FIG. 4), 60' (FIG. 5) or 60'' (FIG. 6) of the air gap intermediate the compression end of the cylinder and the midplane 62, 62', or 62'' of the armature to produce an unbalanced driving force yielding a greater compression than suction stroke force. It is obvious that an effect similar to that illustrated in FIG. 6 can be achieved by altering the centering spring constants so as to displace the null position of the armature.

A check controlled, vibratory tube pump 64, having a lower bell shaped intake 66, extends upwardly through lower casing wall 36 to deliver oil from reservoir 44 to a casing sump 68 via the open, upper delivery end 70 thereof as a function of the reactive reciprocation of casing 14 relative to housing 40.

When running unloaded, the positive downward force from the null position of FIG. 1 exceeds the negative (upward) force from the null position due to the unbalanced electrodynamic driving force as contrasted with a conventional arrangement, such as shown in FIG. 3, wherein the unloaded positive and negative driving force applications would be substantially equal. The unbalanced driving force is, however, calculated to compensate for unbalanced compression forces in the loaded condition so that the greater downward driving force translates into a full positive stroke length under load.

Figure 7:
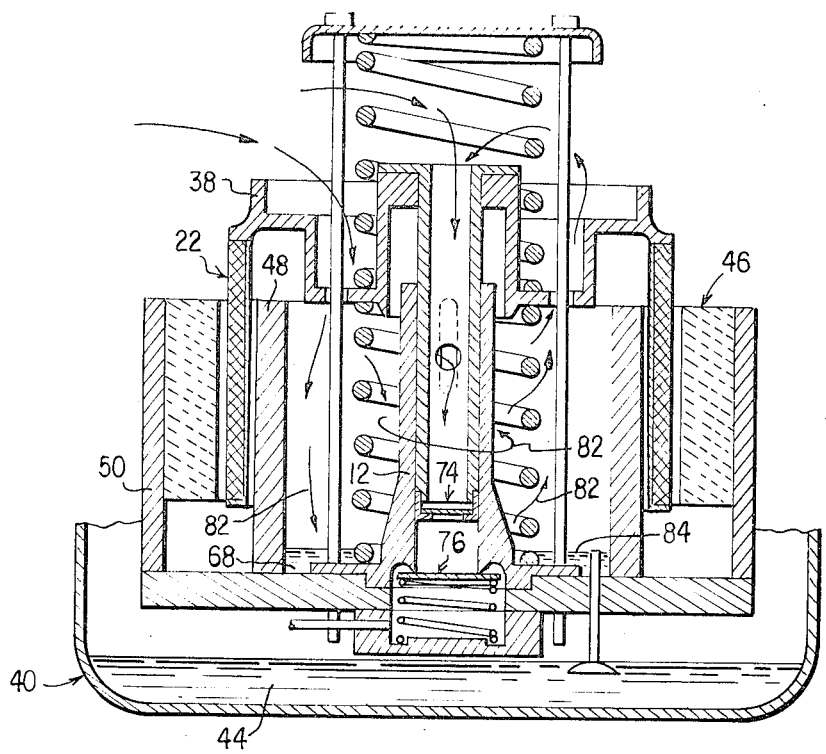
FIG. 7 is a view similar to FIG. 1 illustrating the flow path of a compression medium.

The compression medium, such as refrigerant gas, enters housing 40 via housing inlet 72 from whence it flows generally throughout the housing and compressor casing and enters compression cylinder 12 via the hollow interior of piston 20 and intake valve 74 as illustrated in FIG. 7. Following compression in cylinder end 52, the compressed gas is exhausted through valve 76 for conveyance via line 78 to a condenser.

Permanent magnet array 46 is comprised of three annular segments 80 (FIG. 2) which, because of their ceramic construction, can be formed as relatively massive shapes whereby the entire magnetic circuit 16 can be positioned in surrounding, widely spaced relation to the compression cylinder thus defining an annular cooling space thereabout. The presence of this annular air space, which is effectively defined between the cylinder wall and pole piece 48, thermally insulates the armature and its organic insulation from the compression chamber while the refrigerant gas flow throughout this space, as indicated at 82 in FIG. 7, provides a cooling heat exchange medium in contact with the compression cylinder.

Figure 8:
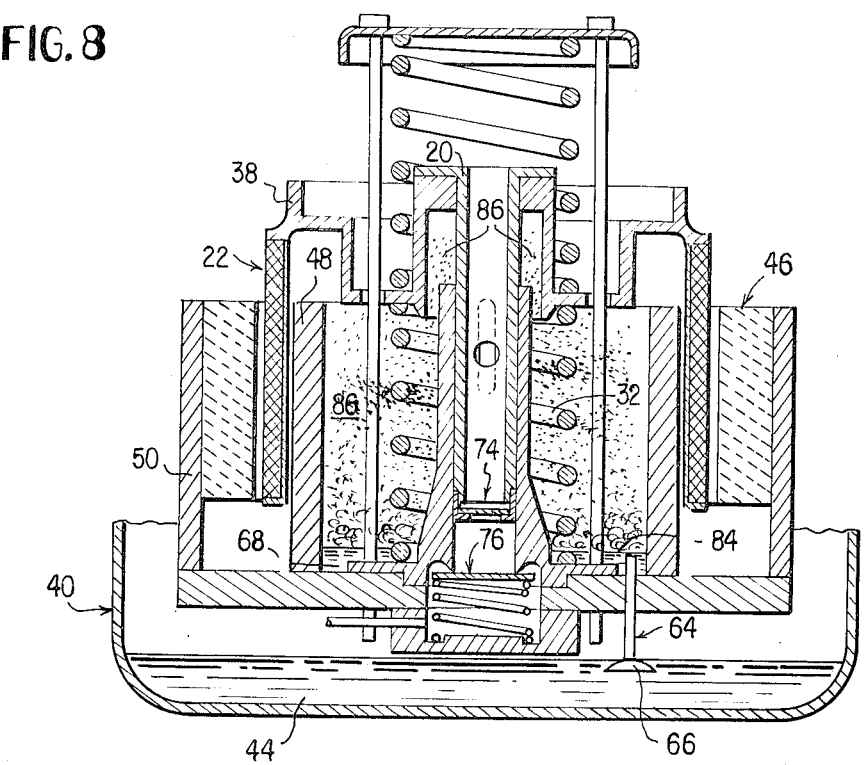
FIG. 8 is a similar view illustrating mist lubrication of the piston and cylinder

The piston and cylinder walls are mist lubricated by oil mist introduction to and about the periphery of these walls at the level of the upper cylinder end by means not clearly understood but which involve no addition to the basic compressor structure except for the vibratory tube pump 64 to supply an operating oil level 84 in casing sump 68 (FIG. 8).

It seems clear that the oil mist 86 is created and reaches the level of the upper cylinder end to bathe reciprocating piston 20 as a function of the compressing and relaxing movement of centering spring 32. However, the precise manner by which this is achieved has not been verified. The most probable explanation appears to be that the violent movement of adjacent spring coils within the body of oil contained in sump 68 creates a froth which is dispersed upwardly as a mist when the froth engages and is further agitated by additional ones of the contracting and relaxing spring coils. A second possible explanation is then a combination of surface tension effects and spring movement causes a thin film to move helically upward along spring 32 with the oil being expelled along the helical path by impact between adjacent spring coils. In either event, since spring 32 is the only movable component in contact with the oil in sump 68 and since the mist lubrication takes place even when the compressor is running unloaded, it appears inescapable that the spring 32 is performing as an oil pump in addition to its piston and armature centering function.

Assuming sump 68 to be empty and the intake 66 of vibratory tube pump 64 to be positioned for reactive reciprocation within reservoir 44; upon energizing armature 22, the casing undergoes reactive reciprocation and oil is lifted from reservoir 44 to sump 68 from which it reaches the upper end of cylinder 12 in the form of a mist via the movement of spring 32.

I claim:

1. An electromagnetically operated, oscillatory compressor having a compression cylinder surrounded by magnetic circuit means including an annular air gap; a piston and annular armature mounted for conjoint reciprocating movement within said cylinder and air gap, respectively; means for energizing said armature and defining a plane of maximum field strength perpendicular to the axis of said annular armature; elastic means biasing said armature and piston toward a null position of said plane of maximum field strength lying intermediate the reciprocating armature stroke length; and the effective midplane of the annular air gap flux density, as measured along the longitudinal axis of the annular air gap, lying intermediate said null position and one end of said reciprocating stroke length.

2. The compressor of claim 1 wherein said magnetic circuit means includes a permanent magnet defining a portion of said air gap.

3. The compressor of claim 1 including permanent magnet means defining one annular wall of said annular air gap.

4. The compressor of claim 3 wherein said permanent magnet means comprise a plurality of annular, ceramic segments.

5. The compressor of claim 1 wherein said magnetic circuit means includes annular, ceramic magnet means; and said magnetic circuit means being radially spaced from said compression cylinder and defining therewith a cooling gas flow passage therebetween for dissipating compression heat from said cylinder to said armature.

6. An electromagnetically operated, oscillatory compressor, comprising; a compression cylinder, having a valved compression end, surrounded by magnetic circuit means including an annular air gap; a piston and annular armature mounted for conjoint reciprocating movement within said cylinder and air gap, respectively; said armature defining a plane of maximum field strength perpendicular to the axis of said annular armature; elastic means biasing said armature and piston toward a null position of said plane of maximum field strength lying intermediate the reciprocating armature stroke length; and the midplane of said annular air gap, as measured along the longitudinal axis thereof, lying intermediate said null position and the compression end of said cylinder for imparting an unbalanced electrodynamic driving force to said armature and piston in the direction of the compression end of said cylinder to compensate for compression forces developed therein.

7. The compressor of claim 6 wherein said magnetic circuit means is radially spaced from said compression cylinder and includes a plurality of permanent, ceramic magnets; and said ceramic magnets comprising one annular wall of said annular air gap.

* * * * *